US 8,589,426 B1

(12) United States Patent
Miles (10) Patent No.: US 8,589,426 B1
(45) Date of Patent: Nov. 19, 2013

(54) SIMULTANEOUS FILE EDITOR (75) Inventor: Fiske Miles, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 929 days.

(21) Appl. No.: 12/260,453

(22) Filed: Oct. 29, 2008

(51) Int. Cl.
 *G06F 17/30* (2006.01)
 *G06F 7/00* (2006.01)

(52) U.S. Cl.
 USPC .......................................... 707/758; 707/803

(58) Field of Classification Search
 USPC .................................. 707/758, 803
 See application file for complete search history.

(56) References Cited

U.S. PATENT DOCUMENTS

| 7,509,325 B2* | 3/2009 | Martin et al. ............... 1/1 |
| 2004/0267743 A1* | 12/2004 | Dasari et al. ............... 707/6 |
| 2005/0154703 A1* | 7/2005 | Ikada ............... 707/1 |
| 2007/0157224 A1* | 7/2007 | Pouliot et al. ............... 725/22 |
| 2009/0012984 A1* | 1/2009 | Ravid et al. ............... 707/101 |

* cited by examiner

*Primary Examiner* — Kuen Lu (57) ABSTRACT

A method is provided for a simultaneous file editor. At least three files are downloaded from at least one computer. Content of the at least three files is stored in a relational database. The content in the relational database is accessed. The content is displayed. Any mismatched lines in the content are identified. The content is edited. The edited content is stored in the relational database. The edited content is uploaded from the relational database as edited versions of the at least three files to the at least one computer.

20 Claims, 7 Drawing Sheets

Fig. 1

| Edit 210 | Add 212 | Delete 214 | Sync 216 | Line # 218 | Content 220 | Computers 222 |
|---|---|---|---|---|---|---|
| Edit | Add | Delete | Sync | 1 | # | |
| Edit | Add | Delete | Sync | 2 | #SME gateway group route db | |
| Edit | Add | Delete | Sync | 3 | # | |
| Edit | Add | Delete | Sync | 4 | # group route 1 route 2 route 3 | |
| Edit | Add | Delete | Sync | 5 | # | |
| Edit | Add | Delete | Sync | 6 | # Mgtwy hash group to SMSC | |
| Edit | Add | Delete | Sync | 7 | # | |
| Edit | Add | Delete | Sync | 8 | MTSMS MTSMSx1 MTSMSx2 | 3 Computers |
| Edit | Add | Delete | Sync | 8 | MTSMS MTSMSx1 MTSMSx3 | Computer 116 |
| Edit | Add | Delete | Sync | 8 | MTSMS MTSMSx1 MTSMSx4 | Computer 118 |
| Edit | Add | Delete | Sync | 9 | Unsynchronized | |

Select Computers 202
Computer 112
Computer 114
Computer 116
Computer 118
Computer 120
Computer 122
Computer 124

Select Files 204
File 224
File 226
File 228
File 230
File 232
File 234

Download File from Computer 206

Upload File to Computer 208

| Select Computers 202 | Select Files 204 | Select File Version 302 |
|---|---|---|
| Computer 112 | File 224 | 200803251111 |
| Computer 114 | File 226 | 200804251629 |
| Computer 116 | File 228 | |
| Computer 118 | File 230 | |
| Computer 120 | File 232 | |
| Computer 122 | File 234 | |
| Computer 124 | | |

Rollback File for Computer 304

| Line # 306 | Current Version 308 | Line # 310 | Backup Version 312 |
|---|---|---|---|
| 1 | # | 1 | # |
| 2 | #SME gateway group route db | 2 | #SME gateway group route db |
| 3 | # | 3 | # |
| 4 | # group route 1 route 2 route 3 | 4 | # group route 1 route 2 route 3 |
| 5 | # | 5 | # |
| 6 | # Mgtwy hash group to SMSC | 6 | # Mgtwy hash group to SMSC |
| 7 | # | 7 | # |
| 8 | MTSMS MTSMSx1 MTSMSx2 | 8 | MTSMS MTSMSx1 MTSMSx2 |
| 9 | MTSMS MTSMSx1 MTSMSx2 | 9 | MTSMS MTSMSx1 MTSMSx3 |
| 10 | MTSMS MTSMSx1 MTSMSx4 | 10 | MTSMS MTSMSx1 MTSMSx4 |
| 11 | MTSMS MTSMSx1 MTSMSx5 | 11 | MTSMS MTSMSx1 MTSMSx5 |

SIMULTANEOUS FILE EDITOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Text editors are often provided with operating systems or software development packages, and can be used to change programming language source code and configuration files. Configuration files, which may be referred to as config files, are used to configure the settings for some computer programs, such as user applications, server processes and operating system settings. Configuration files are often written in American Standard Code for Information Interchange (ASCII) and are often line-oriented, with lines terminated by a newline or carriage return/line feed pair, depending on the operating system. Some configuration files are created and modified using an ASCII editor, while others are created and modified as a side-effect of changing settings in a graphical user interface (GUI) program. Some applications provide tools to create, modify, and verify the syntax of their configuration files. For server processes and operating system settings, the only documentation may be the content of the file. Some configuration files are partially described by man or help pages. Some computer programs only read the configuration files at startup. Other computer programs periodically check the configuration files for changes. Some computer programs can be commanded to re-read the configuration files and apply the changes to the current process, or indeed to read arbitrary files as a configuration file.

SUMMARY

In some embodiments, at least three files are downloaded from at least one computer. Content of the at least three files is stored in a relational database. The content in the relational database is accessed. The content is displayed. Any mismatched lines in the content are identified. The content is edited. The edited content is stored in the relational database. The edited content is uploaded from the relational database as edited versions of the at least three files to the at least one computer.

In some embodiments a system is provided for a simultaneous file editor. The system includes a relational database, a processor, and an editor component. When executed by the processor, the editor component downloads at least three files from at least one computer and stores content of the at least three files in the relational database. The editor component also accesses the content in the relational database, displays the content, identifies any mismatched lines in the content, and edits the content. Additionally, the editor component stores the edited content in the relational database and uploads the edited content from the relational database as edited versions of the at least three files to the at least one computer.

In some embodiments, at least three files are downloaded from at least one computer. Content of the at least three files is stored in a relational database. The content in the relational database is accessed. The content is displayed. Any matched content in the content is identified. The content is edited. The edited content is stored in the relational database. The edited content is uploaded from the relational database as edited versions of the at least three files to the at least one computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Commercially available text editors may enable a user to edit a file or view a comparison of two files for editing purposes. However, some enterprises, such as telecommunication providers, may have to maintain configuration files for thousands of computers. When such an enterprise needs to change a resource, such as a data store, that is accessed by a large number of computers, implementing such a change may require a significant time commitment using typical text editors, and the large number of editing instances may result in many errors.

Embodiments of the present disclosure teach a text editor that provides simultaneous text editing of free-form text files across a plurality of computers, wherein the text files are not identical. The text editor downloads the text files from the plurality of computers and stores the content of the text files as rows in a relational database. The content of every line from each downloaded file is stored in a row in the relational database, where each row may include a computer identifier field, a file identifier field, a line identifier field, and a line contents field. Then the text editor processes the content of the text files—rows in the relational database—using database set commands. When processing of the content of the text files has been completed, for example by making various updates to the rows in the relational database using database update commands, the text editor may be commanded to write the updated content of the text files back to the plurality of computers, for example by reconstituting the text files by reading from the database and then writing the reconstituted files back to the plurality of computers.

For example, an editor component downloads a version of a specific configuration file from each of twenty servers, where the specific configuration file identifies the data store to access. Rather than using string comparisons to identify the similarities and differences for each of the twenty configuration files, the editor component parses each configuration file and stores the content from each configuration file as separate lines in a relational database. The editor component enables a user interface to access and display the content from the relational database. The editor component may display and identify any mismatched lines in the content quickly on the user interface because the content is stored in a relational database, which enables comparisons significantly quicker than string comparisons of text files. In response to the editor component identifying a mismatched line between the twenty configuration files, the user may view the content that corresponds to the mismatched line for each of the files. Displaying the mismatched lines between the twenty configuration files and the corresponding content may enable the user to determine how to edit the twenty configuration files.

If the lines of the twenty configuration files are listed in different orders, the editor component may leverage the capabilities of the relational database by listing content that matches between the twenty configuration files, regardless of the line numbers that correspond to the content. The editor component enables the user to simultaneously edit the content for each of the twenty configuration files, such as replacing the name and address of an old data store with the name and the address of a new data store wherever the name and address of the old data store are found throughout the twenty configuration files. In response to the user selection of a synchronize command, the editor component may copy the content of one line in one file to the corresponding line in many files or copy the content of one file to many similar files. When the edited content is stored in the relational database, backup copies of the associated files are created. The edited content is uploaded from the relational database to the servers as edited versions of the downloaded files, even if the edited versions differ for many of the servers. Each edited version may need to differ because of the presence of unique information, such as software license keys, in the version of each configuration file. In this way, multiple files have been downloaded from multiple computers, simultaneously edited, and then uploaded to the multiple computers.

When a user determines the need to restore a backup version of an edited file, the user selects which backup version will be uploaded, which computers will upload the selected backup version, and initiates the upload of the selected backup version to the selected computers. The editor component may verify that each selected computer once had the backup version before uploading the backup version to each selected computer.

Figure 1:
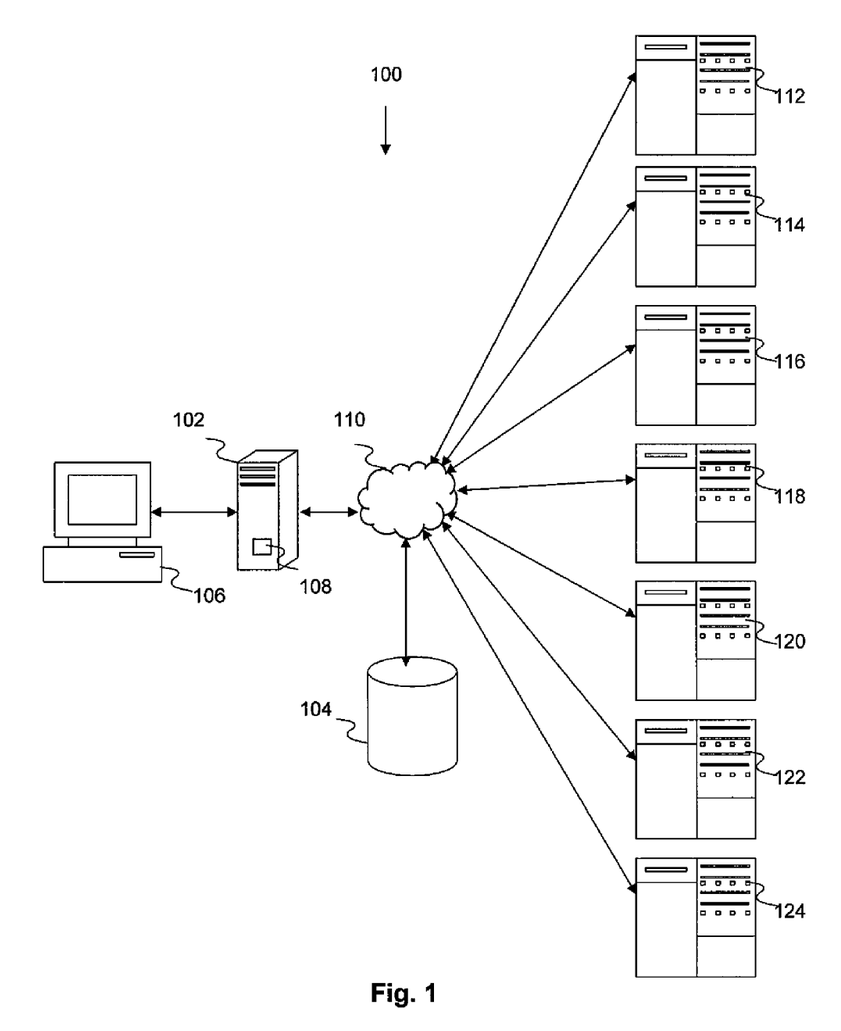
FIG. 1 shows a system for a simultaneous file editor according to some embodiments of the present disclosure.

FIG. 1 shows a system 100 for a simultaneous file editor according to some embodiments of the present disclosure. The system 100 includes a server 102, a relational database 104, and a user interface 106. The server 102 may be implemented on a general purpose computer, such as the computer described below in reference to FIG. 8. FIG. 1 depicts the user interface 106 as a personal computer, but the user interface 106 may also be a monitor associated with a keyboard, a touch screen, or other type of interface that enables a user to interact with the system 100. Although depicted as resident in the server 102, an editor component 108 may be executed by a processor in the server 102, a processor in the user interface 106, and/or by any combination of processors in the server 102 and the user interface 106. Actions taken in response to the processors in the server 102 and the user interface 106 executing the editor component 108 may be described as actions taken by the server 102 and the user interface 106.

The server 102 may communicate via a network 110 to download files from computers 112-124 and store content from the files in the relational database 104. The relational database 104 may be implemented using commercial off-the-shelf software products, for example ORACLE, INFORMIX, MYSQL, POSTGRESQL, or other database products. The content of every line from each downloaded file is stored in a row in the relational database 104, where each row may include a computer identifier field, a file identifier field, a line identifier field, and a line contents field. For example, the editor component 108 stores the content from the first line of a configuration file for the computer 112 as a row in the relational database 104, where fields in the row identify the computer 112, the configuration file, line number 1, and the content for line number 1. The editor component 108 may access the content in the relational database 104, edit the content, and store the edited content in the relational database 104. In an embodiment, the relational database 104 is accessed using structured query language (SQL) set operations and/or set commands. The server 102 may communicate via the network 110 to upload the edited content from the relational database 104 to the computers 112-124 as edited versions of the files previously downloaded from the computers 112-124.

The editor component 108 taught by the present disclosure involves an aspect of indirection in that the files are first downloaded from the computers 112-124, the content of the files are next transformed into a substantially different format as rows in the relational database 104, and then the content of the files is processed to compare and update the content of the files. Additionally, once processed, updating the files on the computers 112-124 again involves an aspect of indirection, because the rows in the relational database 104 are first transformed into a substantially different format as separate files, and then the separate files are written back to the computers 112-124. Typically software developers prefer to avoid additional steps when seeking to promote efficiency and fast execution.

Figure 2:
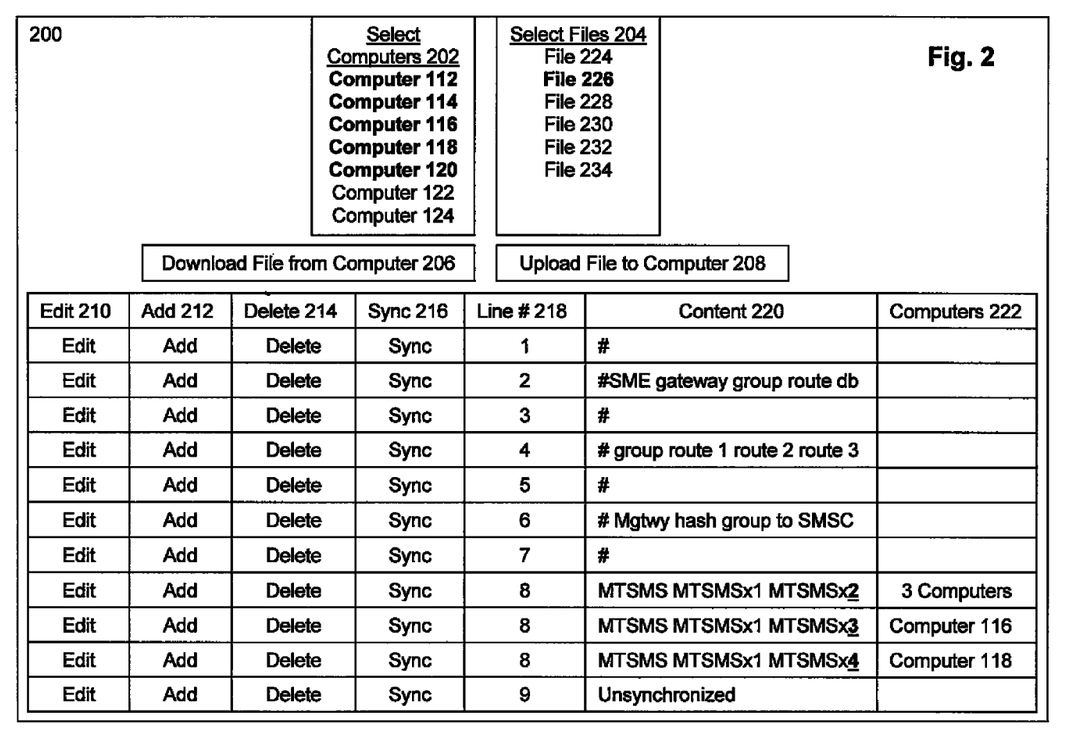
FIG. 2 shows a frame of a graphic user interface for editing according to some embodiments of the present disclosure.

FIG. 2 shows a frame 200 of a graphic user interface for editing according to some embodiments of the present disclosure. The frame 200 includes a "select computers" field 202, a "select files" field 204, a "download file from computer" button 206, an "upload file to computer" button 208, an edit line button 210, an add line button 212, a delete line button 214, a sync line button 216, a line # column 218, a content column 220, and a computers column 222. A user of the user interface 106 may use the "select computers" field 202 to select from which of the computers 112-120 to download or upload files, such as the computers 112-120. The user of the user interface 106 may use the "select files" field 204 to select the files 224-234 in the computers 112-124 for downloading or uploading, such as the file 226. Although FIG. 2 depicts five computers 112-120 selected from seven computers 112-124 and one file 226 selected from six files 224-234, the fields 202 and 204 may have any number of computers 112-124, selected computers 112-120, files 224-234, and selected files 226. FIG. 2 indicates selections of the computers 112-120 and the file 226 by displaying selections in bold font, but other means of indicating selection may be used.

The user of the user interface 106 may initiate the downloading of the selected file 226 from the selected computers 112-120 by selecting the "download file from computer" button 206. After the file 226 has been edited, the user of the user interface 106 may initiate the uploading of the selected file 226 to the selected computers 112-120 by selecting the "upload file to computer" button 206. The computers column 222 lists which of the computers 112-120 contain the corresponding content 220 at the same line number if not all of the computers 112-120 contain the corresponding content 220 at the same line number.

The user of the user interface 106 may edit the content 220 of the file 226 downloaded from the computers 112-120 by viewing the content 220 column and the corresponding line # column 218 and the computers column 222. The content 220 from the file 226 is parsed into separate lines of text. The line # column 218 indicates the line of the parsed file 226 associated with the corresponding row of the content 220. For example, the entry "2" in the line # column 218 corresponds to the row which includes the entry "#SME gateway group route db" in the content column 220. This example indicates that the second line in the file 226 is ""#SME gateway group route db." If the user of the user interface 106 wants to edit add, delete, or synchronize this content 220 that is in the second line of the file 226, the user may select from the column buttons that correspond to the same row and either the line button 210, the add line button 212, the delete line button 214, or the sync line button 216. For example, if the user wants to synchronize the content 220 that is in the eighth line of the file 226 for the computers 116 and 118 with the content 220 that is the eighth line of the file 226 for the computers 112, 114, and 120, the user selects the sync line button 216 that corresponds to the eighth line of the file 226 for the three computers 112, 114, and 120. In response, the editor component copies the content 220 that corresponds to the eighth line of the file 226 for the three computers 112, 114, and 120 to the content 220 that corresponds to the eighth line of the file 226 for the computers 116 and 118 in the relational database 104.

Figure 3:
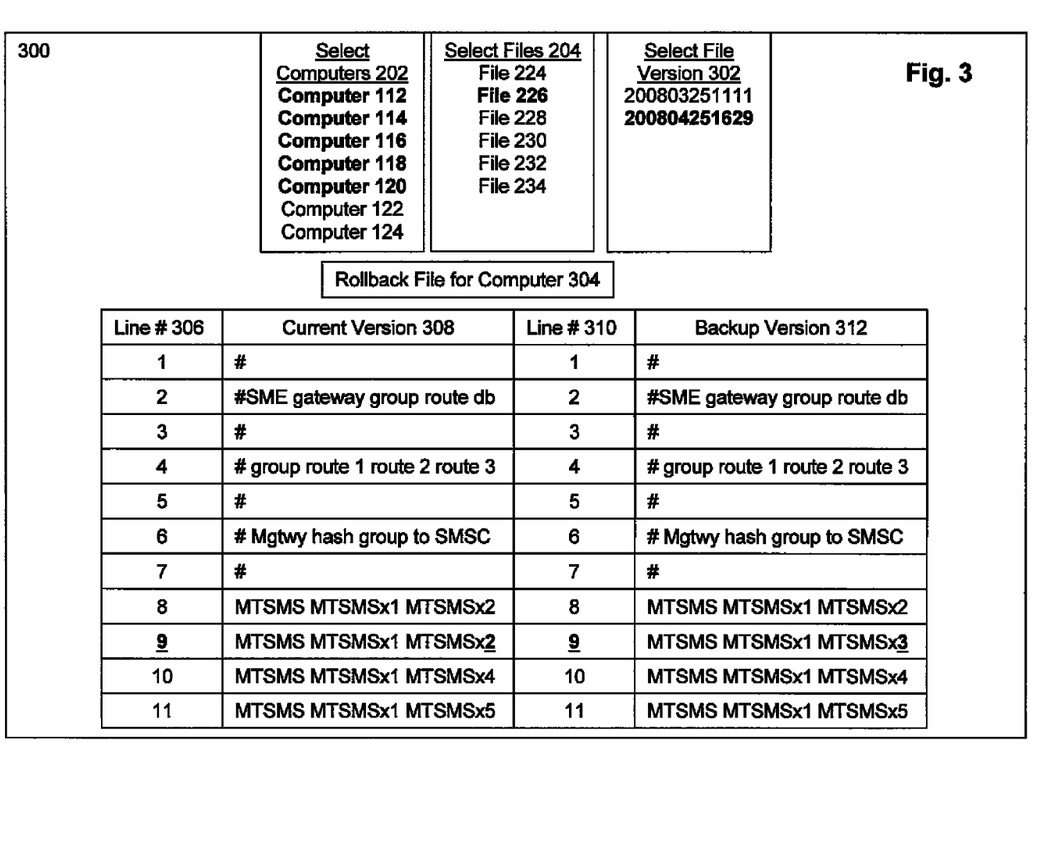
FIG. 3 shows a frame of another graphic user interface for reverting to a backup file version according to some embodiments of the present disclosure.

FIG. 3 shows a frame 300 of another graphic user interface for reverting to a backup file version according to some embodiments of the present disclosure. The frame 300 includes the "select computers" field 202, the "select files" field 204, a "select file version" field 302, a "rollback file for computer" button 304, a line # column 306 corresponding to a current version column 308, and a line # column 310 corresponding to a backup version column 312. Having selected to reset the file 226 to a backup version for the computers 112-120, the user of the user interface 106 can select the file version using the "select file version" field 302. In this example, the selected file version is identified as "200804251629," which indicates that the selected file version was created on Apr. 25, 2008 at 4:29 in the afternoon. Although FIG. 3 depicts two backup file versions for the file 226, the "select file version" field 302 may have any number of backup file versions.

Having selected a backup version of the file 226 to upload to the computers 112-120, the user can use the user interface 106 to view the current version 308 of the file 226 and the backup version 312 of the file 226 to verify the backup version 312 of the file 226 is what the user wants to upload to the computers 112-120. The line # column 306 indicates the line of the parsed file 226 associated with the corresponding row of the current version 308, while the line # column 310 indicates the line of the parsed file 226 associated with the corresponding row of the backup version 312. For example, the fourth line of the file 226 in both the current version 308 and the backup version 312 contains "#group route 1 route 2 route 3."

Figure 4:
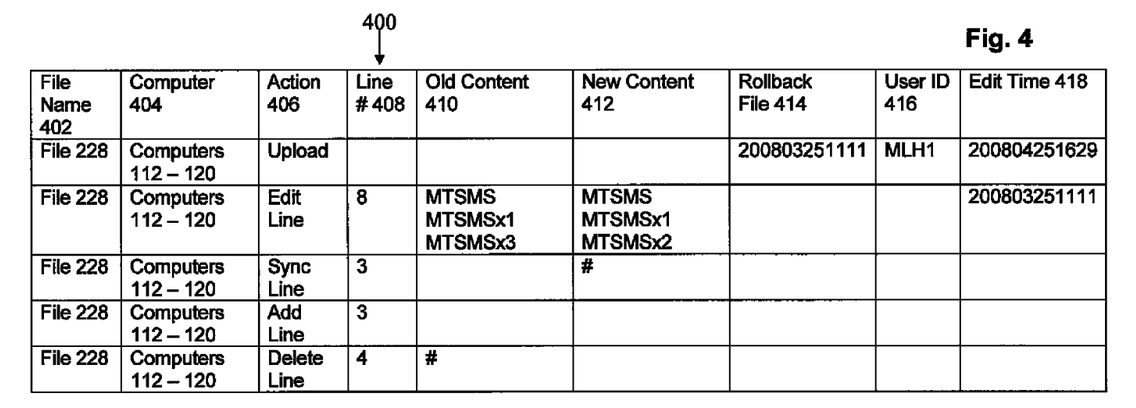
FIG. 4 shows a frame of a graphic user interface for displaying edits according to some embodiments of the present disclosure.

FIG. 4 shows a frame 400 of a graphic user interface for displaying edits according to some embodiments of the present disclosure. The frame 400 includes columns for file name 402, computer 404, action 406, line #408, old content 410, new content 412, rollback file 414, user ID (identification) 416, and edit time 418. The user of the user interface 106 may use the information in the columns 402-418 to review previous edits. For example, the second row of information indicates that line 8 of file 228 was edited for the computers 112-120, where the edit replaced the old content 410 "mtsms mtsmsx1 mtsmsx3" with the new content 412 ""mtsms mtsmsx1 mtsmsx2" at 11:11 in the morning on Mar. 25, 2008.

Figure 5:
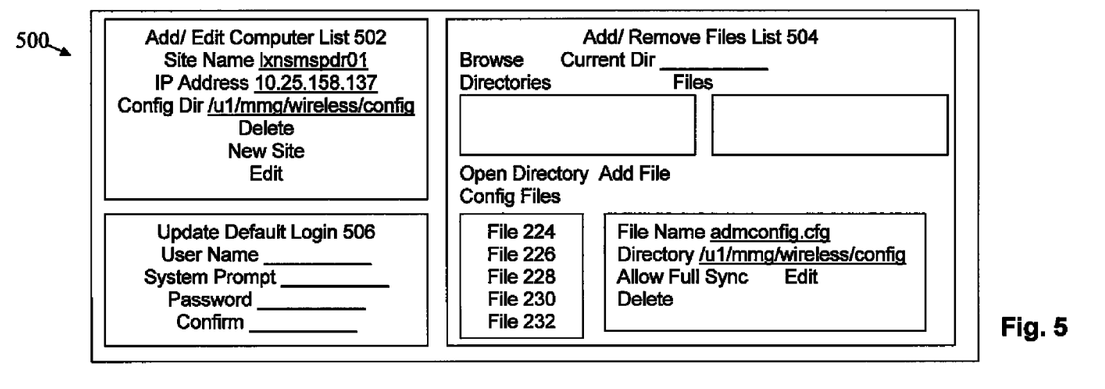
FIG. 5 shows a frame of a graphic user interface for access information according to some embodiments of the present disclosure.

FIG. 5 shows a frame 500 of a graphic user interface for access information according to some embodiments of the present disclosure. The frame 500 includes an "add/edit computer list" panel 502, an "add/remove files list" panel 504, and an "update default login" panel 506. The user of the user interface 106 may use the information in the panels 502-506 to view and edit access information. The user of the user interface 106 may use the "add/edit computer list" panel 502 to add computers to the list of computers that may be selected for downloads and uploads of files. The user of the user interface 106 may use the "add/remove files list" panel 504 to add files to the list of files that may be downloaded from computers and uploaded to computers. The user of the user interface 106 may use the "update default login" panel 506 to modify information that determines access to the system 100 for various potential and actual users.

Figure 6:
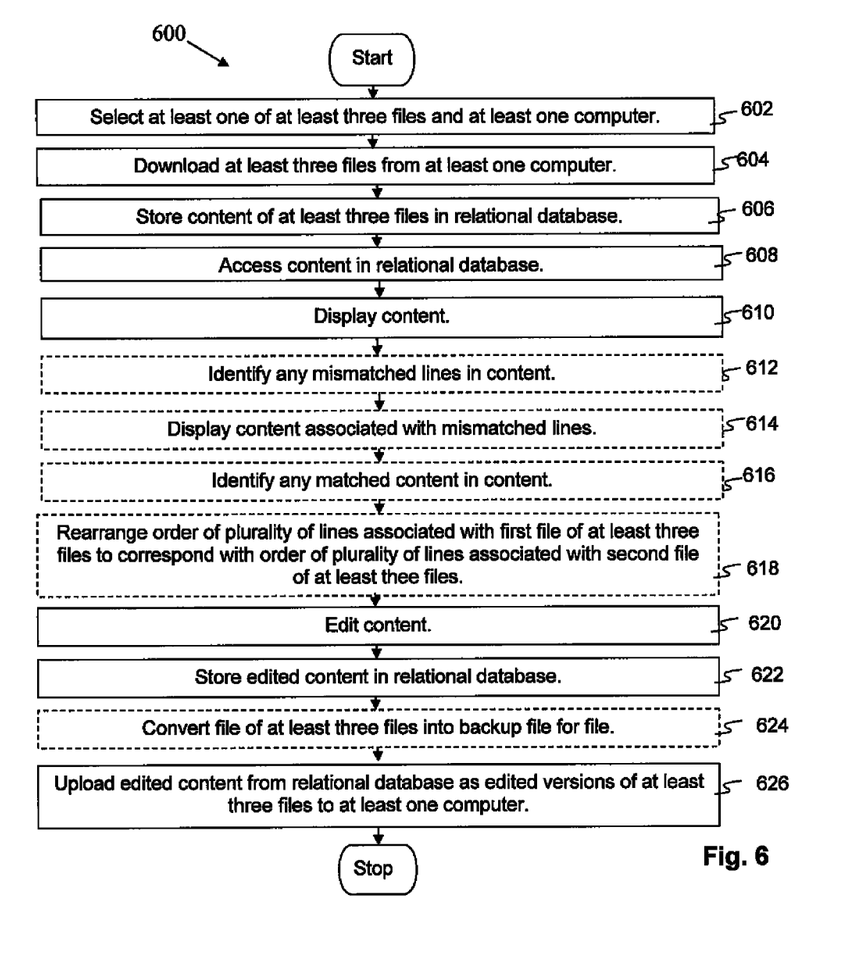
FIG. 6 is a flowchart for a simultaneous file editor method according to some embodiments of the present disclosure.

FIG. 6 shows a flowchart of a method 600 for a simultaneous file editor according to some embodiments of the present disclosure. The system 100 can execute the method 600 to download multiple files from multiple computers, simultaneously edit the content from multiple files, and upload the edited content to multiple computers.

In box 602, at least three files and at least one computer are selected. For example, the editor component 108 selects a version of the configuration file 226 from each of the five computers 112-120 via the frame 200, thereby selecting five files for concurrent editing.

In box 604, at least three files are downloaded from at least one computer. For example, the server 102 downloads a version of the configuration file 226 from each of the five computers 112-120, thereby downloading five files for concurrent editing.

In box 606, content of the at least three files is stored in a relational database. For example, the server 102 stores content from the five versions of the configuration file 226 from the five computers 112-120 in the relational database 104. The content may be used to identify and potentially track modifications made to the content that were not made by the editor component 108. The content that is downloaded and stored in the relational database may be subsequently converted into backup files, as indicated below in box 624.

In box 608, the content in the relational database is accessed. For example, the editor component 108 accesses the content from the five versions of the configuration file 226 that is stored in the relational database 104.

In box 610, the content is displayed. For example, the editor component 108 displays the content from the five versions of the configuration file 226 via the frame 200.

In box 612, any mismatched lines in the content are optionally identified. For example, the editor component 108 identifies that the five versions of the configuration file 226 have multiple versions of line 8, which makes line 8 a mismatched line.

In box 614, content associated with the mismatched lines is optionally displayed. For example, the editor component 108 displays the multiple versions of the content 220 associated with the mismatched line 8 in the frame 200. The editor component 108 may display one of a list of computers that are associated with one of the mismatched lines and a number of computers that are associated with the one of the mismatched lines. For example, the frame 200 depicts that "3 computers" are associated with the first version of the mismatched line 8, which contains the content 220 "mtsms mtsmsx1 mtsmsx2." In another example, the frame 200 depicts that the computer 116 is associated with the second version of mismatched line 8, which contains the content 220 "mtsms mtsmsx1 mtsmsx3." In yet another example, the frame 200 depicts that the computer 118 is associated with the third version of mismatched line 8, which contains the content 220 "mtsms mtsmsx1 mtsmsx4." The editor component 108 may identify any mismatched characters in the mismatched lines. For example, the frame 200 identifies the mismatched characters "2," "3," and "4" in the three versions of the mismatched line 8. Although the frame 200 in FIG. 2 depicts the mismatched characters in bold font and underline font, the frame 200 may depict mismatched characters using other fonts, colors, or means of identification.

In box 616, any matched content in the content is optionally identified. For example, the editor component 108 displays the content 220 based on matching content from the five versions of the configuration file 234 instead of based on matching line numbers for the content 220 from the five versions of the configuration file 234. Displaying matching content may be helpful for instances when previous edits skewed the line numbers for otherwise matching files. For example, the file 234 for each of the computers 112-120 matched for lines 1 through 9 until an inexperienced user modified line 9 for the file 234 for the computer 120 and added a comment line 1 for the file 234 for the computer 120 to document the modification of line 9. Although lines 1 through 8 for the file 234 for the computer 120 still matched lines 1 through 8 for the file 234 for the computers 112-118 prior to the addition of comment line 1, none of the lines for the file 234 for the computer 120 match the lines for the file 234 for the computers 112-118 after the addition of comment line 1. By displaying the matched content for the computers 112-120, the editor component 108 enables the user to verify that the content 220 for the lines 2 through 9 for the file 234 for the computer 120 matches the content 220 for the lines 1 through 8 for the file 234 for the computers 112-118 even though the line numbers for the content 220 for the file 234 for the computer 116 do not match the line numbers for the content 220 for the file 234 for the computers 112-118.

In box 618, an order of a plurality of lines associated with a first file of the at least three files is optionally rearranged to correspond with an order of a plurality of lines associated with a second file of the at least three files. For example, the editor component 108 rearranges the order of the lines for the file 234 for the computer 120 to correspond with the order of the lines for the file 234 for the computers 112-118. The editor component 108 may rearrange the order of the lines for the file 234 for the computer 120 by repositioning the added comment line 1 towards the end of the file 234 for the computer 120, such that the lines 2 through 9 are renumbered as lines 1 through 8, which were their original line numbers and an order of line numbers that matches the file 234 for the computers 112-118.

In box 620, the content is edited. For example, the editor component 108 enables the user to edit the content 220 via the frame 200. Editing the content may include adding or removing characters in any matched line for the 3 computers, or in any mismatched line for one computer, copying content from one of a pair of mismatched lines to the other of the pair of mismatched lines, copying content associated with one file to content associated with another file, inserting a line in the content, and/or deleting another line in the content. For example, in response to the user selecting the sync button from the row that corresponds to the matched line 8 for the 3 computers, the editor component 108 copies the content 220 from the matching line 8 for the file 226 to the mismatched line 8 for the file 226 for the computer 116 and the computer 118. In another example, the editor component 108 copies the content 220 for the file 234 for the computers 112-118 to the content 220 for the file 234 for the computer 120, which results in all of the content 220 for the file 234 matching for all of the computers 112-120. Alternatively, the editor component 108 inserts a comment line 1 from the file 234 for the computer 120 in the content 220 for the file 234 for the computers 112-118, which results in all of the content 220 for the file 234 matching for all of the computers 112-120. In another alternative, the editor component 108 deletes the comment line 1 for the file 234 for the computer 116, which results in all of the content 220 for the file 234 matching for all of the computers 112-120.

In box 622, the edited content is stored in the relational database. For example, the editor component 108 stores the edited content for the files 226 for the computers 112-120 in the relational database 104.

In box 624, one file of the at least three files is optionally converted into a backup file for the one file. For example, the server 102 converts the downloaded files 226 for the computers 112-120 to time-stamped backup files for the files 226 for the computers 112-120, which provides the user with the option for subsequently restoring the backup files for the files 226 to the computers 112-120.

In box 626, the edited content from the relational database is uploaded as edited versions of the at least three files to the at least one computers. For example, the server 102 uploads the edited content from the relational database 104 as edited versions of the files 226 to the computers 112-120.

Figure 7:
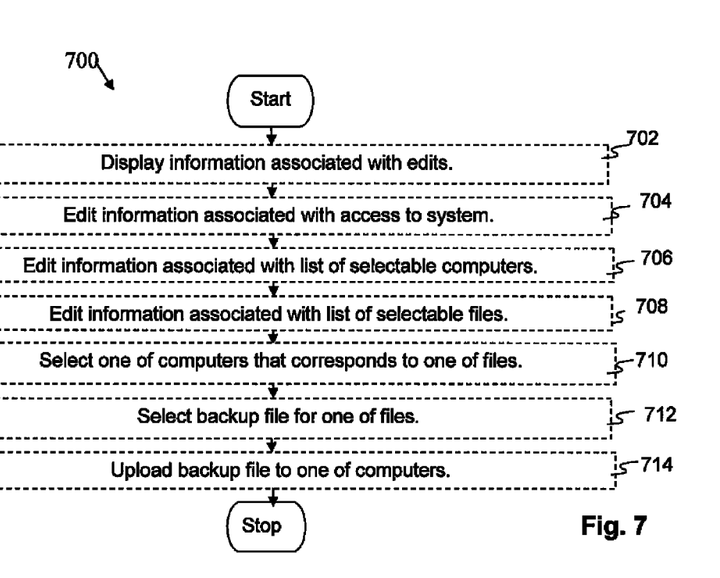
FIG. 7 is a flowchart for another simultaneous file editor method according to some embodiments of the present disclosure.

FIG. 7 shows a flowchart of a method 700 for a simultaneous file editor according to some embodiments of the present disclosure. The system 100 can execute the method 700 to view prior edits, manage access information for users, computers, and files, and roll back a file to a backup version.

In box 702, information associated with a plurality of edits is optionally displayed. For example, the editor component 108 displays the frame 400, which enables a user to view the edits for the file 228, which include a line deletion, a line addition, a line synchronization, a line edit, and a time-stamped file upload.

In box 704, information associated with access to the system is optionally edited. For example, the editor component 108 displays the frame 500, which includes the "update default login" field 506 that enables an administrator to edit the list of users who have access to the system 100 and their respective passwords.

In box 706, information associated with a list of selectable computers is optionally edited. For example, the editor component 108 displays the frame 500, which includes the "add/edit computer list" field 502 to enable the administrator to edit the list of computers 112-124 that may be accessed by the system 100 for uploads and downloads.

In box 708, information associated with a list of selectable files is optionally edited. For example, the editor component 108 displays the frame 500, which includes the add/remove files list" field 504, which enables the administrator to edit the list of files 224-234 that may be accessed by the system 100 for uploads and downloads.

In box 710, one of the at least one computer that corresponds to the one of the at least three files is optionally selected. For example, in response to a user determining to reset the file 226 to a backup version of the file 226, the user selects the file 226 and the computers 112-120 for uploading the backup version of the file 226 via the frame 300.

In box 712, a backup file for one of the at least three files is optionally selected. For example, the user selects the April 25 backup file from the "select file version" field 302.

In box 714, the backup file is optionally uploaded to the one of the at least one computer. For example, the user selects the "rollback file for computer" button 304 to upload the April 25 backup file for the file 226 to the computers 112-120. If one of the computers 112-120 did not previously have the April 25 backup version of the file 226, the user interface 106 may notify the user of this situation so that selected backup files are only uploaded to the computers 112-124 that previously had the selected backup files.

Figure 8:
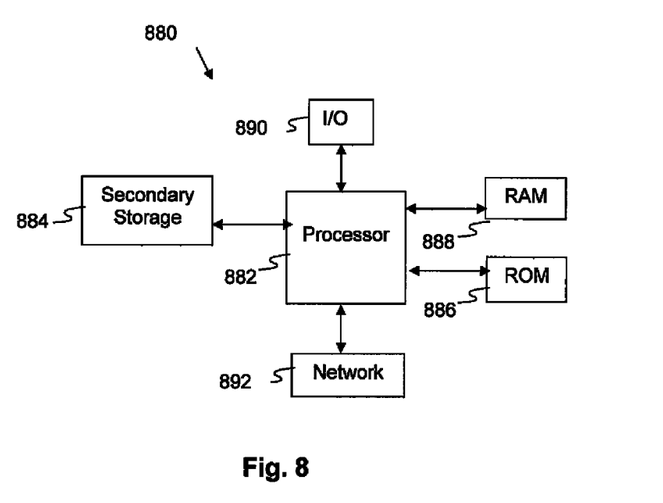
FIG. 8 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave, The baseband signal or signal embodied in the carrier wave generated by the network connectivity devices 892 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 892 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A computer implemented method for a simultaneous file editor, comprising:
　　downloading a plurality of non-identical configuration files corresponding to a plurality of remote computers;

storing content for each downloaded non-identical configuration file as rows in a relational database, wherein each line of a downloaded non-identical configuration file corresponds to a different row in the relational database;

displaying content from each non-identical configuration file stored in the relational database on a user interface, wherein the displayed content includes at least some lines for each of the plurality of non-identical configuration files;

applying an edit made via the user interface to displayed content of one of the plurality of non-identical configuration files to corresponding content of each of the others of the plurality of non-identical configuration files stored in the relational database; and uploading edited non-identical configuration files, comprising the edit to content, from the relational database to each respective computer of the plurality of remote computers.

2. The computer implemented method of claim 1, further comprising displaying information on the user interface to specify a list of source computers from which non-identical configuration files can be downloaded, a list of configuration file versions stored by each of the source computers, a plurality of line numbers that are associated with at least one of the downloaded non-identical configuration files, content that is associated with each of the plurality of line numbers, and mismatched lines identified using content stored in the relational database instead of string comparisons of text files.

3. The computer implemented method of claim 1, wherein each row of the relational database includes a computer identifier field, a file identifier field, a line identifier field, and a line contents field.

4. The computer implemented method of claim 1, wherein said applying an edit is based on at least one of an insert line function, a delete line function, and a sync line function supported by the user interface.

5. The computer implemented method of claim 1, further comprising displaying an edit computer list feature on the user interface to enable a user to update a list of remote computers that can be selected for downloading and uploading non-identical configuration files, and displaying an edit file list feature on the user interface to enable a user to update a list of non-identical configuration files that can be downloaded from remote computers and uploaded to remote computers.

6. A system for a simultaneous file editor, comprising
a relational database;
a processor; and
an editor component, when executed by the processor,
to download a plurality of non-identical configuration files corresponding to a plurality of remote computers and to store content of each downloaded non-identical configuration file as rows in the relational database, wherein each line of a downloaded non-identical configuration file corresponds to a different row in the relational database,
to display content from each non-identical configuration file stored in the relational database on a user interface, wherein the displayed content includes at least some lines for each of the plurality of non-identical configuration files,
to apply an edit made via the user interface to content of one of the plurality of non-identical configuration files to corresponding content of each of the others of the plurality of non-identical configuration files stored in the relational database, and
to upload edited non-identical configuration files, comprising the edit to content, from the relational database to each respective computer of the plurality of remote computers.

7. The system of claim 6, wherein the editor component is further configured to enable a user to select the plurality of remote computers from a list of remote computers and to select the non-identical configuration files to be downloaded from a list of non-identical configuration files.

8. The system of claim 6, wherein each downloaded non-identical configuration file comprises at least one data store identifier that is displayed and which can be edited via the editor component.

9. The system of claim 6, wherein content of each non-identical configuration file stored in the relational database is stored in a plurality of rows, wherein each of the plurality of rows comprises a computer identifier, a file identifier, a line identifier, and content that corresponds to the line identifier.

10. The system of claim 6, wherein the editor component is further configured to display a rollback file feature that, when selected, converts one of the downloaded non-identical configuration files to its backup version.

11. The system of claim 6, wherein the editor component is further configured to display content of mismatched lines from each non-identical configuration file on the user interface.

12. The system of claim 11, wherein the editor component is further configured to display one of a list of computers that are associated with the mismatched lines and a number of computers that are associated with the mismatched lines.

13. The system of claim 11, wherein the editor component is further configured to identify any mismatched characters in the mismatched lines.

14. The system of claim 6, wherein the editor component is configured to apply the edit by updating rows in the relational database using database update commands and to upload the edited content of each configuration file by reconstituting the configuration files from content stored in the relational database and then writing the reconstituted configuration files back to their respective computers.

15. The system of claim 6, wherein the editor component is further configured to edit information associated with a list of users with access to the system and their respective passwords.

16. A computer implemented method for a simultaneous file editor, comprising:
downloading a plurality of non-identical configuration files corresponding to a plurality of remote computers;
storing content for each downloaded non-identical configuration file as rows in a relational database, wherein each line of a downloaded non-identical configuration file corresponds to a different row in the relational database;
displaying content from each non-identical configuration file, wherein the displayed content includes at least some lines for each of the plurality of non-identical configuration files;
applying an edit made via the user interface to displayed content of a particular line of one of the configuration files to content of corresponding lines of each of the others of the plurality of non-identical configuration files stored in the relational database; and
uploading edited non-identical configuration files, comprising the edit to content, from the relational database to each respective computer of the plurality of remote computers.

17. A computer implemented method of claim 16, further comprising rearranging an order of a plurality of lines associated with a first configuration file of the non-identical configuration files to correspond with an order of a plurality of lines associated with a second file of the non-identical configuration files.

18. The computer implemented method of claim 16, further comprising
- selecting a non-identical configuration file from a list of non-identical configuration files;
- selecting a backup configuration file for the selected non-identical configuration file; and
- uploading the backup configuration file to the plurality of remote computers.

19. The computer implemented method of claim 16, further comprising editing information associated with at least one of a list of selectable configuration files and a list of selectable computers associated with the selectable configuration files.

20. The computer implemented method of claim 16, further comprising accessing the content in the relational database using structured query language set commands.

* * * * *